(12) United States Patent
Albertus et al.

(10) Patent No.: US 9,590,230 B2
(45) Date of Patent: Mar. 7, 2017

(54) METAL/AIR FLOW BATTERY

(71) Applicant: Robert Bosch GmbH, Stuttgart (DE)

(72) Inventors: Paul Albertus, Mountain View, CA (US); John F. Christensen, Mountain View, CA (US); Timm Lohmann, Mountain View, CA (US); Nalin Chaturvedi, Sunnyvale, CA (US); Christina Johnston, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 446 days.

(21) Appl. No.: 13/955,918

(22) Filed: Jul. 31, 2013

(65) Prior Publication Data
US 2014/0044999 A1 Feb. 13, 2014

Related U.S. Application Data (60) Provisional application No. 61/680,866, filed on Aug. 8, 2012.

(51) Int. Cl.
*H01M 2/40* (2006.01)
*H01M 10/42* (2006.01)
*H01M 12/08* (2006.01)

(52) U.S. Cl.
CPC .......... *H01M 2/40* (2013.01); *H01M 10/4242* (2013.01); *H01M 12/08* (2013.01)

(58) Field of Classification Search
CPC .... H01M 8/188; H01M 2/40; H01M 10/4242; H01M 12/08
See application file for complete search history.

(56) References Cited

U.S. PATENT DOCUMENTS

| 4,180,623 A | * | 12/1979 | Adams | 429/400 |
| 5,135,820 A | * | 8/1992 | Jones | H01M 10/52 429/49 |
| 5,366,824 A | * | 11/1994 | Nozaki et al. | 429/471 |

(Continued)

FOREIGN PATENT DOCUMENTS

| JP | 2011222412 A | 11/2011 |
| JP | 2012028017 A | 2/2012 |

OTHER PUBLICATIONS

JP2012028017 machine translation.*
(Continued)

*Primary Examiner* — Miriam Stagg
*Assistant Examiner* — Brian Ohara
(74) *Attorney, Agent, or Firm* — Maginot Moore & Beck LLP (57) ABSTRACT

In one embodiment, a battery system includes a negative electrode, a separator adjacent to the negative electrode, a positive electrode separated from the negative electrode by the separator, the positive electrode including an electrode inlet and an electrode outlet, an electrolyte including about 5 molar LiOH located within the positive electrode, and a first pump having a first pump inlet in fluid communication with the electrode outlet and a first pump outlet in fluid communication with the electrode inlet and controlled such that the first pump receives the electrolyte from the electrode outlet and discharges the electrolyte to the electrode inlet during both charge and discharge of the battery system.

16 Claims, 8 Drawing Sheets

(56) References Cited

U.S. PATENT DOCUMENTS

| | | | | |
|---|---|---|---|---|
| 5,413,881 | A | * | 5/1995 | Licht ..................... H01M 4/581 429/103 |
| 5,427,873 | A | * | 6/1995 | Shuster .................. H01M 6/34 429/188 |
| 2002/0037455 | A1 | * | 3/2002 | Tani et al. ..................... 429/223 |
| 2002/0050458 | A1 | * | 5/2002 | Matsukawa ......... H01M 8/0206 205/118 |
| 2004/0131926 | A1 | * | 7/2004 | Jones .................... H01M 2/043 429/64 |
| 2006/0051649 | A1 | * | 3/2006 | Jeon ................. H01M 8/04089 429/410 |
| 2011/0033748 | A1 | * | 2/2011 | Nakatsuji ............. B22F 1/0088 429/218.2 |
| 2012/0183868 | A1 | | 7/2012 | Toussaint et al. |

OTHER PUBLICATIONS

International Search Report and Written Opinion corresponding to PCT Application No. PCT/US2013/053054, mailed Oct. 28, 2013 (19 pages).

He, Ping et al., "A Li-Air Fuel Cell with Recycle Aqueous Electrolyte for Improved Stability," Electrochemistry Communications, Oct. 1, 2010, pp. 1686-1689, vol. 12, No. 12; Elsevier, Amsterdam, NL (4 pages).

Wang, Yarong et al., "Li-Redox Flow Batteries Based on Hybrid Electrolytes: At the Cross Road between Li-ion and Redox Flow Batteries," Advanced Energy Materials, Jun. 4, 2012, pp. 770-779, vol. 2, No. 7 (10 pages).

Abraham et al., "A polymer electrolyte-based rechargeable lithium/oxygen battery", Journal of the Electrochemical Society; 1996; pp. 1-5; vol. 143, No. 1; Norwood, USA (5 pages).

Amatucci et al., "Flouride based electrode materials for advanced energy storage devices," Journal of Flourine Chemistry; 2007; pp. 243-262; vol. 128, No. 4; Elsevier; North Brunswick, USA (20 pages).

Beattie et al., "High-Capacity Lithium-Air Cathodes", Journal of the Electrochemical Society; 2008; vol. 156; Canada (13 pages).

Cabana et al., "Beyond Intercalation-Based Li-Ion Batteries: The State of the Art and Challenges of Electrode Materials Reacting Through Conversion Reactions", Advanced Materials; 2010; pp. E170-E192; vol. 22, No. 35; Wiley; Europe (23 pages).

Kumar et al., "A Solid-State, Rechargeable, Long Cycle Life Lithium-Air Battery", Journal of the Electrochemical Society; 2010; pp. A50-A54; vol. 157, No. 1; Needham, USA (5 pages).

Ogasawara et al., "Rechargeable Li2O2 Electrode for Lithium Batteries", Journal of the American Chemical Society; 2006; pp. 1390-1393; vol. 128, No. 4; Switzerland (4 pages).

Read, "Characterization of the Lithium/Oxygen Organic Electrolyte Battery," Journal of the Electrochemical Society; 2002; pp. A1190-A1195; vol. 149; Army Research Laboratory, Adelphi, USA (6 pages).

Read et al., "Oxygen Transport Properties of Organic Electrolytes and Performance of Lithium/Oxygen Battery", Journal of the Electrochemical Society; 2003; pp. A1351-A1356; vol. 150, No. 10; Army Research Laboratory, Adelphi, USA (6 pages).

USABC Goals for Advanced Batteries (1 page).

Yang et al., "The effect of oxygen pressures on the electrochemical profile of lithium/oxygen battery", Journal of Solid State Electrochemistry; 2010; pp. 109-114; Springer-Verlag; China (6 pages).

Zheng et al., "Theoretical Energy Density of Li-Air Batteries", Journal of the Electrochemical Society; 2008; pp. A432-A437; vol. 155, No. 6; USA (6 pages).

Christensen et al., "A Critical Review of Li/air Batteries," Journal of the Electrochemical Society; 2012; vol. 159(2) R1-R30, USA (30 pages).

Hutchings et al., "Electrochemical oxygen separation and compression using planar cosintered ceramics," Solid State Ionics; 2008; vol. 179 pp. 442-450, Salt lake City, USA (8 pages).

* cited by examiner

METAL/AIR FLOW BATTERY

This application claims the benefit of U.S. Provisional Application No. 61/680,866 filed Aug. 8, 2012, the entire contents of which is herein incorporated by reference.

TECHNICAL FIELD

This disclosure relates to batteries and more particularly to metal/oxygen based batteries.

BACKGROUND

Rechargeable lithium-ion batteries are attractive energy storage systems for portable electronics and electric and hybrid-electric vehicles because of their high specific energy compared to other electrochemical energy storage devices. A typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. While such lithium-based batteries have a sufficiently high specific energy (Wh/kg) and energy density (Wh/L) to be useful in electric-powered vehicles, the practical capacity of 180 to 250 mAh/g is quite low compared to the specific capacity of lithium metal, 3861 mAh/g.

Figure 1:
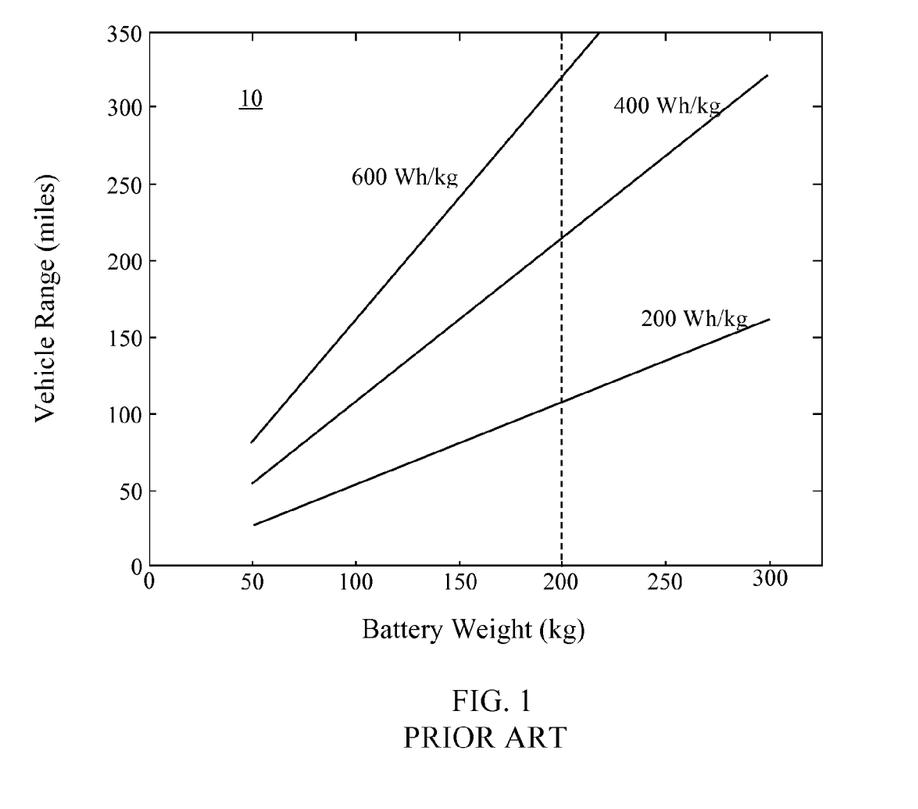
FIG. 1 depicts a plot showing the relationship between battery weight and vehicular range for various specific energies.

Moreover, even 250 mAh/g does not provide the necessary range for an electric/hybrid vehicle as evidenced by FIG. 1. FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Accordingly, to provide the desired vehicular range, a battery with a higher specific energy than the present state of the art (an intercalation system with a graphite anode and transition-metal oxide cathode) is necessary. The highest theoretical capacity achievable for a lithium-ion positive electrode is 1794 mAh/g (based on the mass of the lithiated material), for $Li_2O$. Other high-capacity materials include $BiF_3$ (303 mAh/g, lithiated), $FeF_3$ (712 mAh/g, lithiated), and others. Unfortunately, all of these materials react with lithium at a lower voltage compared to conventional oxide positive electrodes, hence limiting the theoretical specific energy. Nonetheless, the theoretical specific energies are still very high (>800 Wh/kg, compared to a maximum of ~500 Wh/kg for a cell with lithium negative and conventional oxide positive electrodes, which may enable an electric vehicle to approach a range of 300 miles or more on a single charge.

Figure 2:
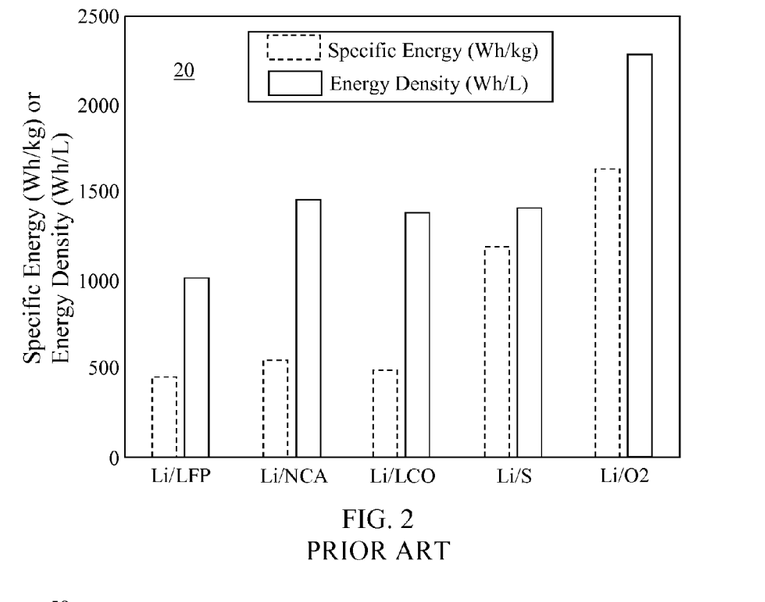
FIG. 2 depicts a chart of the specific energy and energy density of various lithium-based cells.

As noted above, batteries with a lithium metal negative electrode afford exceptionally high specific energy (in Wh/kg) and energy density (in Wh/L) compared to batteries with conventional carbonaceous negative electrodes. Various lithium-based chemistries have been investigated for use in various applications including in vehicles. FIG. 2 depicts a chart 20 which identifies the specific energy and energy density of various lithium-based chemistries. In the chart 20, only the weight of the active materials, current collectors, binders, separator, and other inert material of the battery cells are included. The packaging weight, such as tabs, the cell can, etc., are not included. As is evident from the chart 20, incorporation of Li metal as the negative electrode provides a significant advantage, at least theoretically, for the lithium-oxygen system compared with the lithium-ion cells with conventional positive-electrode materials such as $Li_yCoO_2$ or $Li_yNi_{0.80}Co_{0.15}Al_{0.05}O_2$. The use of other metals can also offer a higher specific energy than Li-ion cells with conventional positive electrodes.

The chart 20 further indicates that lithium/oxygen batteries, even allowing for packaging weight, are capable of providing a specific energy >600 Wh/kg and thus have the potential to enable driving ranges of electric vehicles of more than 300 miles without recharging, at a similar cost to typical lithium ion batteries. Therefore, lithium/oxygen batteries area an attractive option in the search for a battery cell that provides the desired vehicular range.

Figure 3:
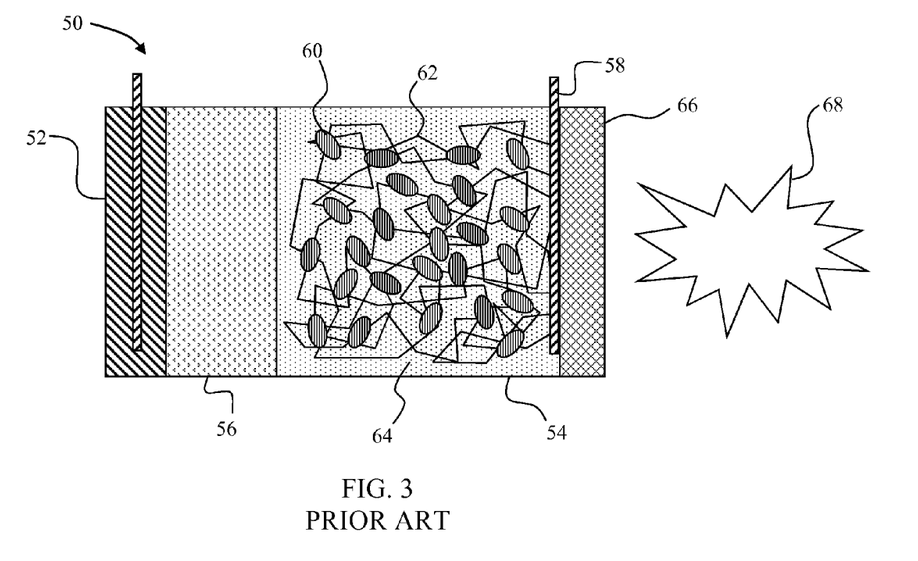
FIG. 3 depicts a prior art lithium-oxygen (Li/oxygen) cell including two electrodes, a separator, and an electrolyte.

A typical lithium/oxygen electrochemical cell 50 is depicted in FIG. 3. The cell 50 includes a negative electrode 52, a positive electrode 54, a porous separator 56, and a current collector 58. The negative electrode 52 is typically metallic lithium. The positive electrode 54 includes electrode particles such as particles 60 possibly coated in a catalyst material (such as Au or Pt) and suspended in a porous, electrically conductive matrix 62. An electrolyte solution 64 containing a salt such as $LiPF_6$ dissolved in an organic solvent such as dimethyl ether or $CH_3CN$ permeates both the porous separator 56 and the positive electrode 54. The $LiPF_6$ provides the electrolyte with an adequate conductivity which reduces the internal electrical resistance of the cell 50 to allow a high power In some cells, the electrolyte may include LiOH or, in aqueous solutions, LiOH and LiCl.

A portion of the positive electrode 52 is enclosed by a barrier 66. The barrier 66 in FIG. 3 is configured to allow oxygen from an external source 68 to enter the positive electrode 54 while filtering undesired components such as gases and fluids. The wetting properties of the positive electrode 54 prevent the electrolyte 64 from leaking out of the positive electrode 54. Alternatively, the removal of contaminants from an external source of oxygen, and the retention of cell components such as volatile electrolyte, may be carried out separately from the individual cells.

Oxygen from the external source 68 enters the positive electrode 54 through the barrier 66 while the cell 50 discharges and oxygen exits the positive electrode 54 through the barrier 66 as the cell 50 is charged. In operation, as the cell 50 discharges, oxygen and lithium ions are desired to combine to form a discharge product $Li_2O_2$ or $Li_2O$ in accordance with the following relationship:

The positive electrode 54 in a typical cell 50 is a lightweight, electrically conductive material which has a porosity of at least 50% to allow the formation and deposition/storage of $Li_2O_2$ in the cathode volume. The ability to deposit the $Li_2O_2$ directly determines the maximum capacity of the cell. In order to realize a battery system with a specific energy of 600 Wh/kg or greater, a plate with a thickness of 125 μm must have a capacity of about 20 mAh/cm². Materials which provide the needed porosity include carbon black, graphite, carbon fibers, carbon nanotubes, and other non-carbon materials.

While there is a great potential for lithium-oxygen systems, there are also significant challenges that must be addressed before the lithium-oxygen system becomes commercially viable. Important challenges include reducing the hysteresis between the charge and discharge voltages (which limits the round-trip energy efficiency), improving the number of cycles over which the system can be cycled reversibly, and designing a system that actually achieves a high specific energy and has an acceptable specific power.

Figure 4:
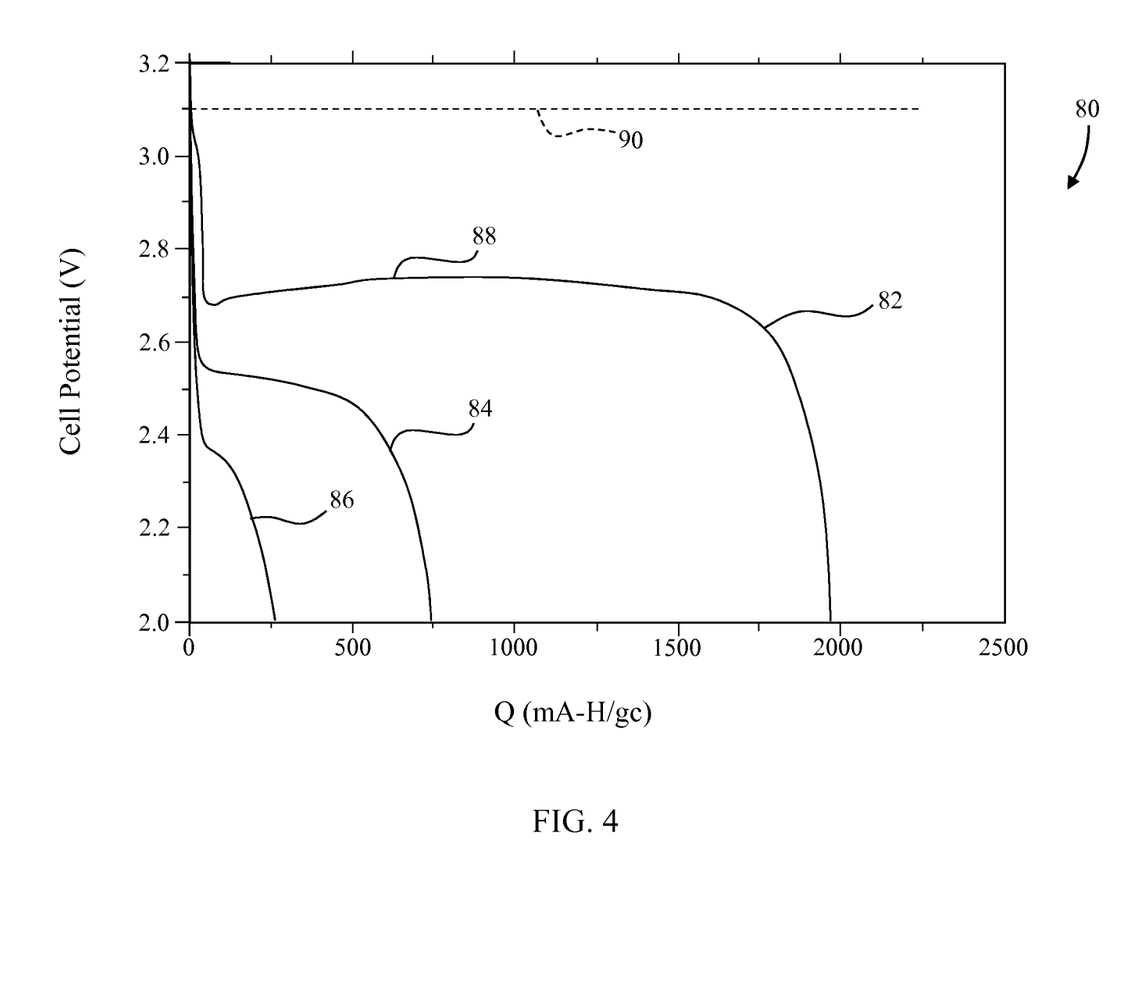
FIG. 4 depicts discharge curves for a metal/oxygen battery showing an increasing difference between the actual capacity of a battery and the theoretical capacity of the battery as the rate of discharge increases.

One problem which has arisen in attempting to produce a commercially viable lithium/oxygen battery is that the practical capacity of such batteries is substantially lower than the theoretical capacity. By way of example, FIG. 4 depicts a graph 80 with three discharge curves 82, 84, and 86. The discharge curve 82 indicates the realized voltage and capacity of a metal/oxygen battery when the battery is discharged at a rate of 0.1 mA. The discharge curve 82 includes a plateau region 88 that is well below the equilibrium potential 90 of the battery, indicating a high kinetic resistance. The difference between the equilibrium potential 90 and the discharge curve 82 indicates a large difference between the actual capacity of the battery and the theoretical capacity of the battery.

The discharge curves 84 and 86 indicate the realized voltage and capacity of the metal/oxygen battery when the battery is discharged at a rate of 0.5 mA and 1.0 mA, respectively. The curves 84 and 86 indicate that at higher rates of discharge, the difference between the actual capacity of the battery and the theoretical capacity of the battery increases.

Figure 5A:
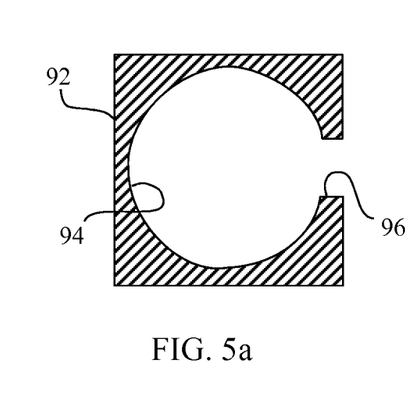
FIG. 5a depicts a portion of a carbon matrix including a pore opening into the matrix through a neck.
Figure 5B:
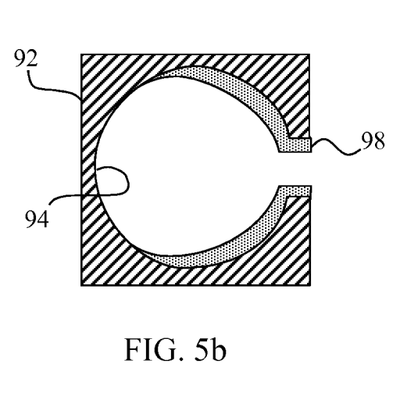
FIG. 5b depicts the carbon matrix of FIG. 5a after discharge product has begun to coat portions of the neck and pore.
Figure 5C:
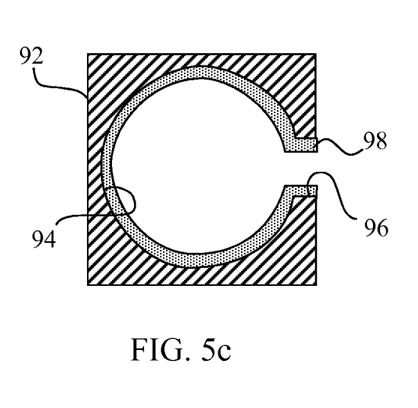
FIG. 5c depicts the carbon matrix of FIG. 5a when the entire surface of the pore and neck have been coated, thereby precluding electrons from being available to form additional discharge products.
Figure 5D:
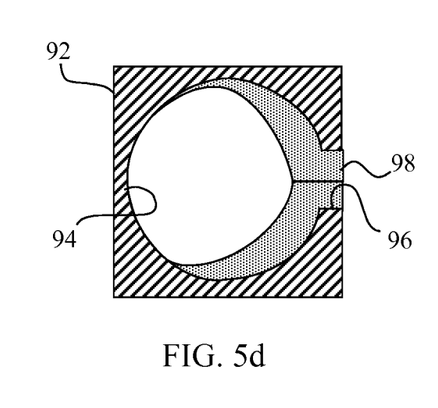
FIG. 5d depicts the carbon matrix of FIG. 5a when the neck has been blocked by discharge products, thereby precluding $Li^+$ and $O_2$ from being available to form additional discharge products.

One potential cause of the difference between the actual capacity of the battery and the theoretical capacity of the battery may be the $Li_2O_2$ which forms during discharge. While the formation of solid $Li_2O_2$ (or $Li_2O$) product is desired, the $Li_2O_2$ may coat the conductive matrix of the positive electrode and/or block the pores of the electrode. By way of example, FIG. 5a depicts a carbon matrix 92 which includes a pore 94 which has a neck 96 which allows for electrolyte to communicate with the pore 94. As discharge occurs, $Li^+$ and $O_2$ combine at the surface of the carbon matrix 92 with an electron that passes through the carbon matrix 92 to form a discharge product $Li_2O_2$ 98 as depicted in FIG. 5b. As the discharge product 98 forms, it may coat the entire surface of the pore 94 and neck 96 as depicted in FIG. 5c. The solid product 98 is thought to be electronically insulating, at least in its crystalline, bulk form. Thus, no electrons pass through the discharge product 98 and no further reduction occurs in the configuration of FIG. 5c. In some instances, the discharge product 98 closes the neck 96 as depicted in FIG. 5d. Accordingly, while electrons may be available at uncovered portions of the pore 94, no $Li^+$ and $O_2$ can pass through the neck 96 and no further reduction occurs. Such suboptimal distribution of the $Li_2O_2$ or other solid discharge product, such as $LiOH.H_2O$ in an aqueous variant, may reduce the capacity of the cell.

Unfortunately, the reduced capacity resulting from formation of solid $Li_2O_2$ (or $Li_2O$) product in an electrode cannot be offset simply by enlarging the size of the electrode. In addition to weight and size considerations in applications such as electric vehicles, a number of physical processes which cause voltage drops within an electrochemical cell, and thereby lower energy efficiency and power output, are exasperated by increased electrode size. Additionally, mass-transfer limitations are an important limitation at high current densities. The transport properties of aqueous electrolytes are typically better than nonaqueous electrolytes, but in each case mass-transport effects can limit the thickness of the various regions within the cell, including the cathode.

What is needed therefore is a lithium/oxygen battery that exhibits increased capacity compared to known metal/oxygen batteries. More specifically, a lithium/oxygen battery which reduces the difference between practical capacity of the battery and the theoretical capacity of the battery would be beneficial.

SUMMARY

In one embodiment, a battery system includes a negative electrode, a separator adjacent to the negative electrode, a positive electrode separated from the negative electrode by the separator, the positive electrode including an electrode inlet and an electrode outlet, an electrolyte including about 5 molar LiOH located within the positive electrode, and a first pump having a first pump inlet in fluid communication with the electrode outlet and a first pump outlet in fluid communication with the electrode inlet and controlled such that the first pump receives the electrolyte from the electrode outlet and discharges the electrolyte to the electrode inlet during both charge and discharge of the battery system.

In another embodiment, a method of operating a battery system includes providing a negative electrode, providing a separator adjacent to the negative electrode, providing a positive electrode separated from the negative electrode by the separator, the positive electrode including an electrode inlet and an electrode outlet, providing an electrolyte including about 5 molar LiOH located within the positive electrode, and operating a first pump having a first pump inlet in fluid communication with the electrode outlet and a first pump outlet in fluid communication with the electrode inlet to receive the electrolyte from the electrode outlet and discharge the electrolyte to the electrode inlet during both charge and discharge of the battery system.

DETAILED DESCRIPTION

Figure 6:
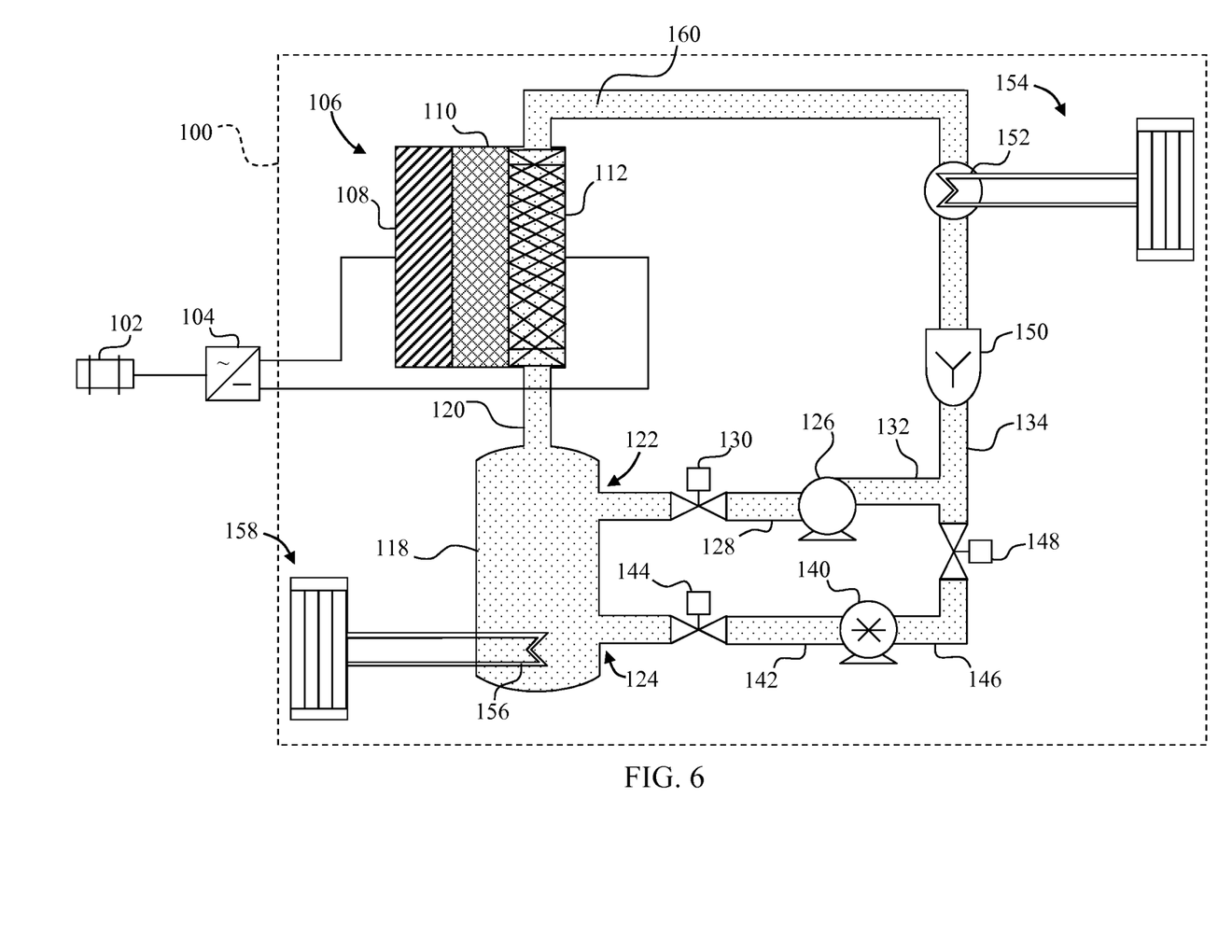
FIG. 6 depicts a schematic view of a lithium-oxygen (Li/oxygen) system with a reservoir configured to store discharge products outside of the positive electrode.

A schematic of a battery system 100 is shown in FIG. 6. In one embodiment, the battery system 100 is used to power a vehicle motor 102 through a bi-directional inverter 104. The battery system 100 includes a cell or cell stack 106 which includes a lithium negative electrode 108, a separator 110, and a positive electrode 112. The separator 110 is a dense solid electrolyte that transports metal ions but is a barrier to electrons, liquid electrolyte, and oxygen or other species.

The positive electrode 112 is a porous matrix of electronically conducting material defining a continuous network of passages. The positive electrode 112 includes carbon or some other electronically conductive material that provides a continuous path for electrons, optionally catalyst materials (especially for oxygen reduction and evolution in aqueous chemistries), and optionally binder material. The electrode is porous, with electrolyte 160 in the pores and, in some embodiments, includes gas channels. The conductive material is contacted to an electronically conductive gas-diffusion layer (e.g., from carbon fiber) at the back side (opposite side from the separator 110). The gas-diffusion layer (GDL) is open to oxygen or air (from the environment or from an oxygen tank).

The positive electrode 112 is in fluid connection with a reservoir 118 through a header 120. The reservoir 118 includes two outlets 122 and 124. The outlet 122 is connected to the suction side of a centrifugal pump 126 by a discharge header 128. A discharge header control valve 130 is located in the discharge header 128. In one embodiment (not shown), the discharge header control valve 130 is located in an outlet header 132 which connects the centrifugal pump 126 to a supply header 134.

The outlet 124 is connected to the suction side of a peristaltic pump 140 by a charging header 142. A charging header control valve 144 is located in the charging header 142. An outlet header 146 connects the pump 140 to the supply header 134. A mixing control valve 148 is located in the outlet header 146.

The supply header 134 is in fluid communication with the positive electrode 112. A mixer 150 and a heat exchanger portion 152 of a temperature control unit 154 are operably positioned within the supply header 134. Additionally, an exchanger portion 156 of a temperature control unit 158 is operably positioned within the reservoir 118.

In the embodiment of FIG. 6, the reservoir 118, positive electrode 112, and headers 128, 132, 134, 142, and 146 are substantially filled with an aqueous electrolyte including about 5 molar (M) LiOH and any desired additives. The aqueous electrolyte further includes dissolved $O_2$.

In operation, the cell stack 106 provides DC power to the bidirectional inverter 104 which in turn powers the motor 102. Power in the cell stack 106 is generated by $O_2$ reduction in the positive electrode 112 according to the following equation:

$$2\,Li^+ + \frac{1}{2}O_2 + H_2O \leftrightarrow 2LiOH \text{ (positive electrode)}$$

As the battery system 100 is discharging, the pump 126 draws a suction on the reservoir 118 through the discharge header control valve 130 which is open, and discharges the electrolyte 160 from the reservoir 118 into the supply header 134. During discharge, the charging header control valve 144 and/or the mixing control valve 148 is shut. Accordingly, the electrolyte 160 within the supply header 134 passes through the mixer 150 and the heat exchanger 152 and then into the positive electrode 112. The heat exchanger 152 maintains the electrolyte 160 that is supplied to the positive electrode 112 at a desired temperature. In one embodiment, the electrolyte 160 that is supplied to the positive electrode 112 is maintained at about 25° C.

The flow of electrolyte 160 into the positive electrode 112 provides a source of dissolved $O_2$ for use in further oxidation. Additionally, oxygen is introduced into the positive electrode 112 through the GDL. In some embodiments, a GDL located along the flow path of the electrolyte outside of the positive electrode is provided in addition to or as an alternative to the GDL in the positive electrode 112.

Accordingly, LiOH is generated in the positive electrode in accordance with the equation above as lithium moves from the negative electrode 108 through the separator 110 and into the positive electrode 112. As LiOH is generated, the concentration of the LiOH in the positive electrode 112 increases. The freshly supplied electrolyte 160 flushes the electrolyte 160 with the increased concentration of LiOH out of the positive electrode 112 and into the reservoir 118. The concentration of LiOH flushed into the reservoir 118 thus increases to above 5M.

The reservoir 118 is configured to encourage formation of monohydrate crystals as the concentration of LiOH in the electrolyte 160 within the reservoir 118 increases during charge. In different embodiments, one or more of gravitational separation, mechanical, evaporative, and thermal separation, or nucleation is used to encourage formation of monohydrate crystals. Thermal management is used in some embodiments to change the concentration (via evaporation) or solubility limit (via cooling) of the LiOH within the electrolyte 160, with both mechanisms resulting in precipitation of the monohydrate crystals. Filtration in some embodiments includes the use of a fine mesh that collects solid particles larger than the mesh size. The filtration system in some embodiments is self-cleaning so that the collected particles are moved to a separate storage area. In some embodiments, nucleation particles are injected into the reservoir 118. In embodiments including an ethanol/$H_2O$ solvent mixture, water is injected resulting in a lowering the solubility limit of LiOH in the electrolyte 160, thus resulting in spontaneous LiOH.$H_2O$ precipitation By way of example, in the embodiment of FIG. 6 the heat exchanger 156 may be used to cool the electrolyte 160 within the lower portion of the reservoir 118 to less than 25° C. The solubility limit of LiOH is 5.3M at 25° C. Thus, by cooling the electrolyte 160 within the reservoir 118 to a temperature below 25° C., monohydrate crystals will form as the LiOH enriched electrolyte 160 from the positive electrode 112 enters into the reservoir 118.

The embodiment of FIG. 6 further incorporates a gravitational mechanism to encourage formation of monohydrate crystals within the reservoir 118. As noted above, the charging header control valve 144 and/or the mixing control valve 148 is shut during discharge. Accordingly, a "dead zone" is created at the lower portion of the reservoir 118 since suction is taken by the centrifugal pump 126 at a level (outlet 122) located above the level of the outlet 124. Accordingly, gravity produces a density gradient of the electrolyte 160 and monohydrate crystal mix in the reservoir 118 with solid products including LiOH.$H_2O$, to settle to the bottom of the reservoir 118.

Figure 7:
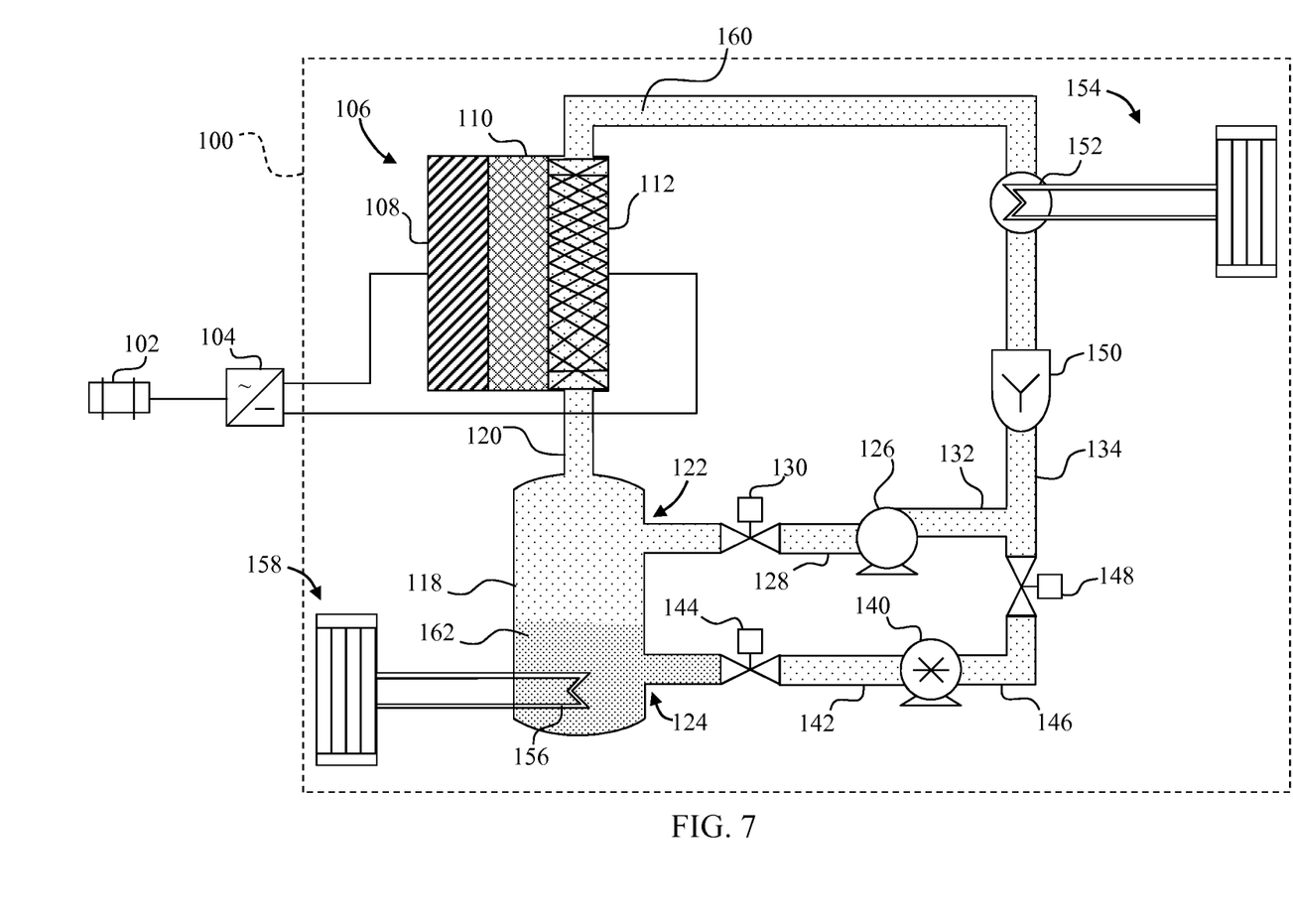
FIG. 7 depicts the system of FIG. 6 after discharge of the system has caused discharge products to be collected in the reservoir.

Discharge of the system 100 thus results in the configuration of FIG. 7. In FIG. 7, monohydrate crystals 162 and electrolyte 160 are located within the lower portion of the reservoir 118 as a slurry. Because the LiOH is precipitated within the lower section of the reservoir 118, the concentration of the electrolyte 160 at the outlet 122 is maintained at about 5.3 M. Accordingly, the electrolyte 160 provided to the electrode 112 is maintained at about 5M even during discharge. This reduces the potential of crystal formation within the positive electrode 112.

Figure 8:
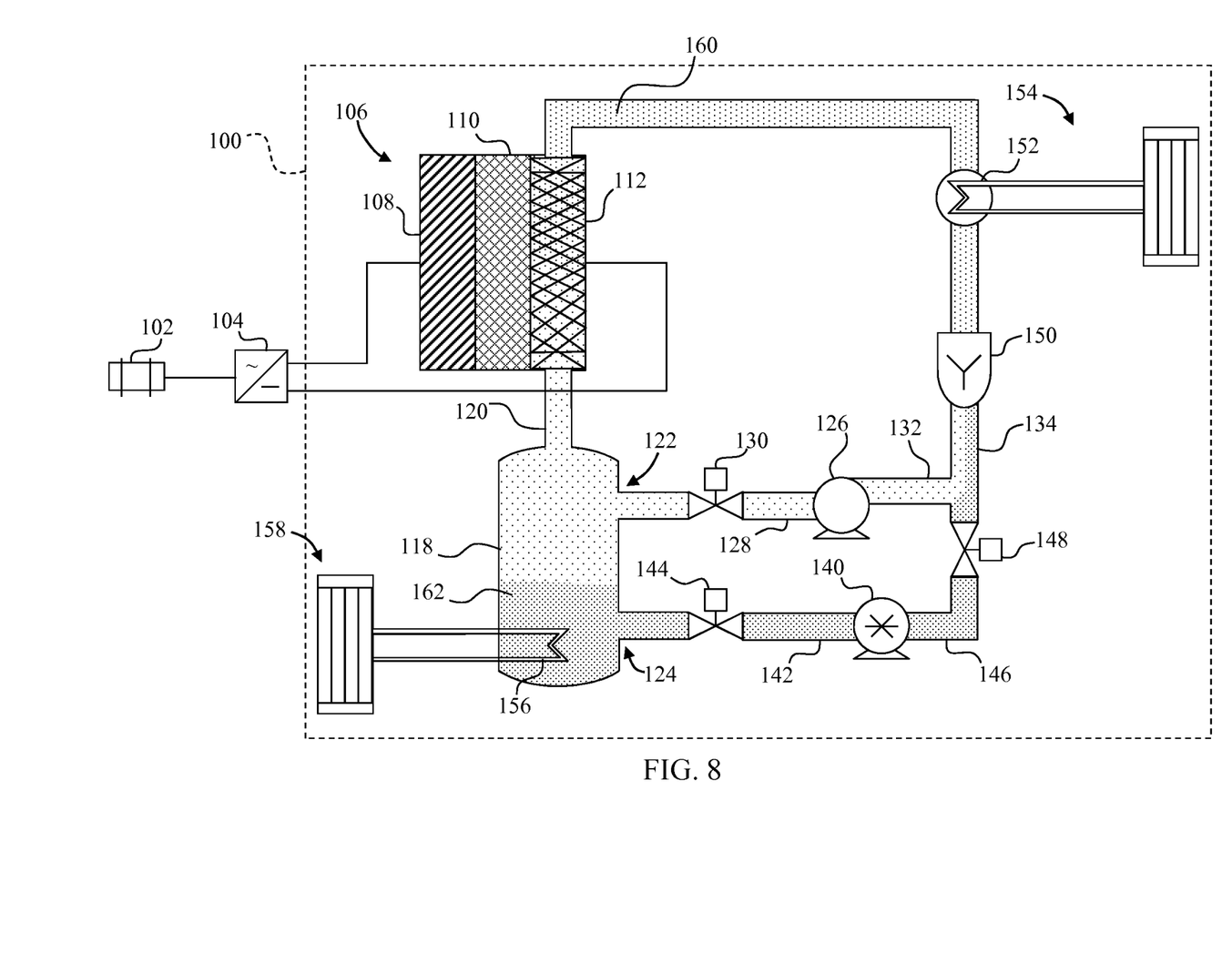
FIG. 8 depicts the system of FIG. 6 after charging of the system has been initiated, and the discharge products in the reservoir are being dissolved into the electrolyte.

When the battery system is to be charged, it is not necessary to change the direction of flow. The solid LiOH.$H_2O$ is in equilibrium with dissolved LiOH.$H_2O$. Therefore, simply reversing the direction of the current in the cell 106 will result in consumption of LiOH.$H_2O$ as long as the flow is maintained. Accordingly, charging of the system 106 includes opening the charging header control valve 144 along with the mixing valve 148. The pump 126 and the pump 140 then take suction on the reservoir 118 as depicted in FIG. 8.

The pump 126 pumps predominantly electrolyte 160 which, after discharge, may be slightly higher than 5M. The pump 140 pumps a mixture of predominantly electrolyte 160 and perhaps some monohydrate crystals 162. The electrolyte 160 pumped by the pump 140 will be at about the solubility limit for LiOH. The mixer 150 mixes the effluent from the two pumps 126/140. Accordingly, at least some of the monohydrate crystals 162 dissolve through the mixer 150. Additionally, the heat exchangers 156 and 152 may be used to increase the temperature of the electrolyte 160, thereby allowing for additional dissolution of the monohydrate crystals 162.

Within the positive electrode 112, $Li^+$ is removed during charge, thereby reducing the concentration of LiOH within the electrolyte 160. The electrolyte 160 with the lower concentration of LiOH is then moved into the reservoir 118. The lower concentration of LiOH in the electrolyte 160 entering the reservoir 118 allows for further dissolution of the monohydrate crystals 162 (via thermodynamic equilibrium) into the electrolyte 160 until either charging is completed or all monohydrate crystals 162 are removed.

The above described processes are modified for various embodiments. In one embodiment, the discharge header control valve 130 is closed, and only effluent from the pump 140 is provided to the supply header 134. In some embodiments, the heat exchanger 156 is used to heat the slurry of electrolyte 160 and monohydrate crystals 162 prior to pumping, thereby increasing the molarity of the electrolyte in the lower portion of the reservoir 118 above 5.3M.

Additionally, while the embodiment of FIG. 6 depicts a single cell 106, other embodiments include multiple cells 106 (a cell stack). Thus, a single reservoir services multiple cells 106. In yet another embodiment, multiple reservoirs 118 are provided.

Figure 9:
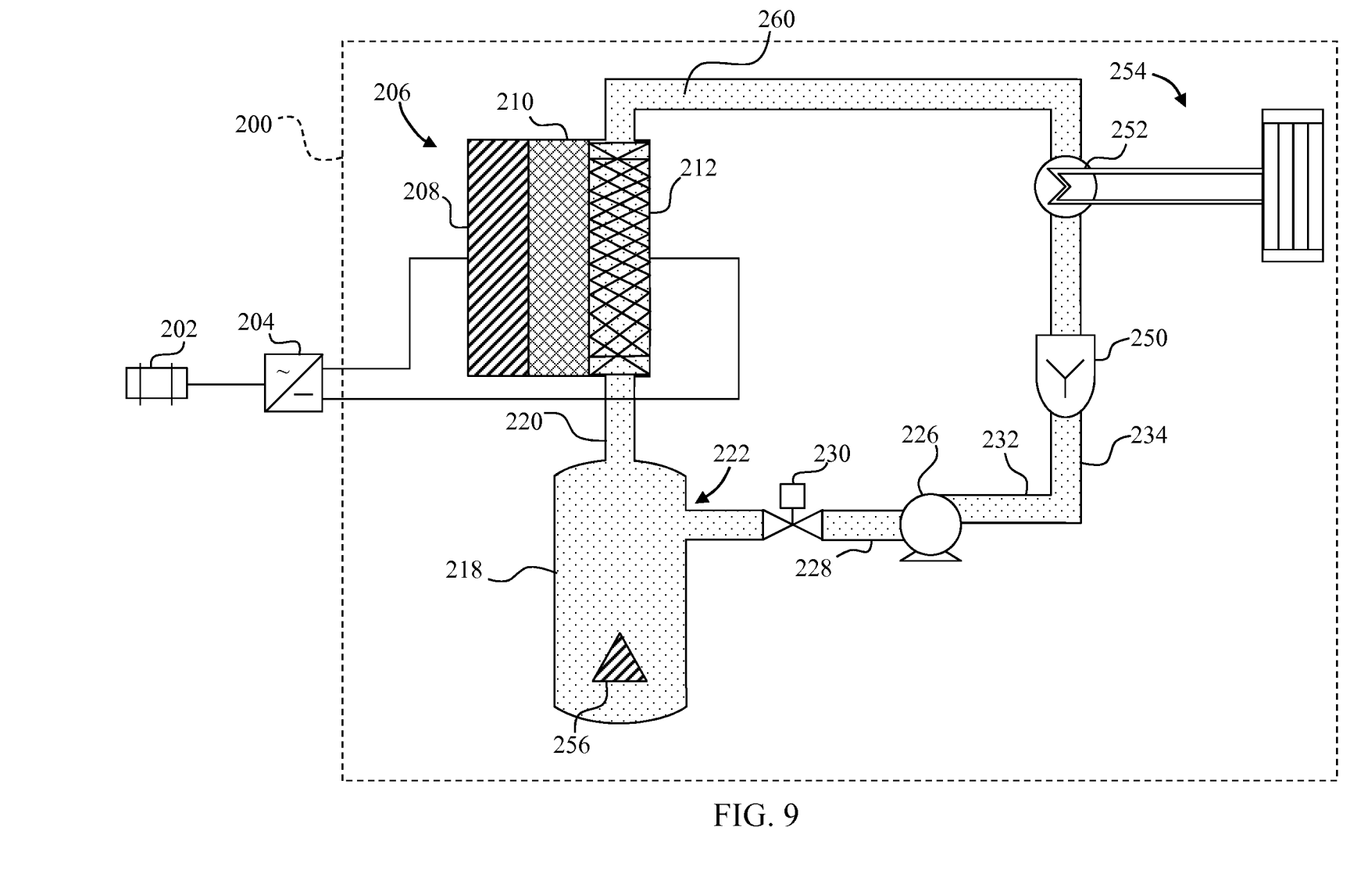
FIG. 9 depicts a schematic view of a lithium-oxygen (Li/oxygen) system with a reservoir configured to store discharge products outside of the positive electrode where a nucleation structure is provided in the reservoir.

FIG. 9 depicts yet another embodiment of a battery system 200 incorporating features of the disclosure. The battery system 200 is used to power a vehicle motor 202 through a bi-directional inverter 204. The battery system 200 includes a cell or cell stack 206 which includes a lithium negative electrode 208, a separator 210, and a positive electrode 212 which may be constructed in the same manner as the like components in the embodiment of FIG. 6.

The positive electrode 212 is in fluid connection with a reservoir 218 through a header 220. The reservoir 218 includes a single outlet 222. The outlet 222 is connected to the suction side of a centrifugal pump 226 by a discharge header 228. A discharge header control valve 230 is located in the discharge header 228. In one embodiment (not shown), the discharge header control valve 230 is located in an outlet header 232 which connects the centrifugal pump 226 to a supply header 234.

The supply header 234 is in fluid communication with the positive electrode 212. A mixer 250 and a heat exchanger portion 252 of a temperature control unit 254 are operably positioned within the supply header 234.

In the embodiment of FIG. 9, the reservoir 218, positive electrode 212, and headers 228, 232, and 234 are substantially filled with an aqueous electrolyte 160 including about 5 molar (M) LiOH and any desired additives. The aqueous electrolyte further includes dissolved $O_2$.

The battery system 200 further includes a nucleation structure 256. The nucleation structure 256 includes channels/piping/tubing with a bellmouth or other similar construction to facilitate crystallization of super-saturated LiOH electrolyte 260 into LiOH.$H_2O$. The monohydrate crystals form over some fins, bellmouth or other similar construction.

Operation of the system 200 is similar to the operation of the system 100. During discharge, crystal formation is avoided in the headers 228, 232, and 234 and the positive electrode 212 because of the flow of the electrolyte. The nucleation structure 256, however, provides a relatively stationary flow area. Accordingly, the monohydrate crystals preferentially form on the fins, bellmouth or other similar construction of the nucleation feature 256. During charging, 5M LiOH is circulated in the positive electrode 212 with $Li^+$ being removed from the solution to the Li-anode 208. As this progresses, LiOH solution concentration falls below 5M, allowing monohydrate crystals to dissolve (via thermodynamic equilibrium) into the electrolyte 260 until either charging is completed or all monohydrate is removed. Further charging causes a drop in LiOH concentration.

In some embodiments, an agitator is provided in the reservoir (118 or 218) to assist in dissolution of the monohydrate crystals during charge operations.

In some embodiments, operation of the various components is controlled by a battery management system which includes a memory and a processor. The processor executes program instructions which are stored in the memory in order to control the various components. Accordingly, the processor can control the temperature of the electrolyte within the system, as well as the pump speed. Thus, during lower power operation, electrolyte is fed into the positive electrode at a slower rate.

Additionally, various sensors may be provided throughout the system to assist in control of the system. The sensors include temperature sensors positioned to sense the temperature at the upper and lower portion of the reservoir, at the mixer, after the heat exchanger in the supply header, and at the discharge from the positive electrode. Pressure sensors and flow sensor are also provided in various embodiments.

The processor in some embodiments is further configured to provide control of the position of the various control/mixing valves. Accordingly, the processor controls the amount of monohydrate crystals which may be pumped into the supply header so as to avoid clogging the pores of the positive electrode.

By storing solid product (e.g., monohydrate crystals) in a reservoir, passivation of the cathode surface, which limits capacity and current density, is avoided. Additionally, mechanical stress on the cathode structure, caused by precipitation on the surface and in the pores of the cathode, is also reduced.

By locating the reservoir outside of the current path, current gradients, which tend to be formed in the direction of gravity, or gradients of liquid porosity are avoided. Such gradients could result in non-uniform Li stripping (during discharge) or plating (during charge), "hot spots," poor utilization of active electrode area, non-uniform aging, or other deleterious operation of the cell.

The above described embodiments also prevent reaction of solid discharge products with cell components such as the cathode and the solid-electrolyte protection layer on top of the Li anode. Accordingly, any irreversible reaction of LiOH with $CO_2$ to form $Li_2CO_3$ is avoided. Similarly, in aprotic embodiments, irreversible reactions of $Li_2O_2$ with carbon cathode materials to form $Li_2CO_3$ is avoided.

The above described embodiments also separate the energy storage capacity and the power capability of the system. Hence, a wide variety of power/energy ratios can be easily implemented, simply by increasing or decreasing the size of the reservoir tank (as well as the Li anode metal thickness) relative to the total active area of the cell stack.

Additionally, by controlling the flow through the cathode, a desired level of convective mass transfer is achieved that may increase the limiting current of the system, thereby enabling higher current densities and smaller (cheaper) cell stacks.

Finally, because the discharge product is not stored within the positive electrode, the cells can be made thinner and more economical. A thinner cell design will have lower impedance (hence, higher current density is enabled).

While the foregoing embodiments depicted aqueous cells, the system can be modified to extend to aprotic systems with some peroxide solubility. For example, certain solvents or additives can provide some solubility of $Li_2O_2$. The $Li_2O_2$ will precipitate as a solid once its solubility limit is surpassed. Hence, the above described modes of operation in which $LiOH.H_2O$ is the discharge product for aqueous systems are substantially identical to aprotic systems with peroxide solubility.

By way of example, in embodiments incorporating aprotic $Li/O_2$ cells, where $Li_2O_2$ is the discharge product, the electrolyte may contain a solvent that includes N—H groups such that N—H . . . O bonding provides solubility of the peroxide dianion ($O_2^{2-}$). The electrolyte in some embodiments further includes an additive such as an anion receptor that recognizes the peroxide dianion ($O_2^{2-}$), thereby providing solubility to the $Li_2O_2$ discharge product. Examples of anion receptors include a class of boron-based anion receptors as reported by Xie et al., "New electrolytes using $Li_2O$ or $Li_2O_2$ oxides and tris(pentafluorophenyl) borane as boron based anion receptor for lithium batteries," Electrochem Comm., 2008, p. 1195, as well as a class of cryptands that make use of N—H . . . O bonds to stabilize the $O_2^{2-}$ as reported by Lopez et al., "Reversible Reduction of Oxygen to Peroxide Facilitated by Molecular Recognition," Science 335, 450 (2012).

Additionally, while the above described embodiments incorporated pumps to assist electrolyte flow, wherein the flow was always in the same direction, some embodiments are bi-directional flow embodiments, with the flow of electrolyte reversed for charging operations.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

The invention claimed is:

1. A battery system, comprising:
a negative electrode;
a separator adjacent to the negative electrode;
a positive electrode separated from the negative electrode by the separator, the positive electrode including an electrode inlet and an electrode outlet;
an electrolyte including LiOH located within the positive electrode;
a reservoir having a reservoir inlet configured to receive the electrolyte from the positive electrode, a first reservoir outlet, and a second reservoir outlet, the second reservoir outlet located lower than the first reservoir outlet such that an unattached solid proximate the first reservoir outlet is forced by gravity toward the second reservoir outlet;
a first pump having a first pump inlet configured to take a suction on the first reservoir outlet and discharge a first effluent through a first pump outlet to the electrode inlet and controlled such that the first pump receives the electrolyte from the reservoir inlet and discharges the first effluent to the electrode inlet during both charge and discharge of the battery system; and
a second pump having a second pump inlet configured to take a suction on the second reservoir outlet and a second pump outlet configured to discharge a second effluent to the electrode inlet, the system controlled such that the first effluent is not mixed with the second effluent during discharging of the battery system, and such that the first effluent is mixed with the second effluent during charging discharging of the battery system.

2. The battery system of claim 1, wherein the reservoir is located lower than the electrode outlet such that an unattached solid within the positive electrode is forced by gravity toward the reservoir inlet.

3. The battery system of claim 1, wherein the reservoir comprises:
a nucleation structure configured to facilitate crystallization of super-saturated LiOH electrolyte into $LiOH.H_2O$.

4. The battery system of claim 1, wherein the second pump is a peristaltic pump.

5. The battery system of claim 1, further comprising:
a mixer component in fluid communication with the first pump, the second pump, and the electrode inlet, the mixer configured to receive and mix the first effluent from the first pump outlet and the second effluent from the second pump outlet, and to provide the mixed electrolyte to the electrode inlet.

6. The battery system of claim 5, further comprising:
a first heat exchanger located between the mixer and the electrode inlet.

7. The battery system of claim 6, wherein the first heat exchanger is configured to maintain the electrolyte provided to the electrode inlet at a temperature above a solubility limit for LiOH in the mixed first effluent and second effluent.

8. The battery system of claim 6, further comprising a second heat exchanger, the second heat exchanger located within the reservoir.

9. The battery system of claim 8, wherein the second heat exchanger is controlled to heat electrolyte within the reservoir during charging.

10. The battery system of claim 9, wherein the second heat exchanger is controlled to cool electrolyte within the reservoir during discharging.

11. The battery system of claim 5, further comprising:
a mixing control valve in fluid communication with the first pump, the second pump, and the mixer, and located between the mixer and the first pump outlet and between the mixer and the second pump outlet.

12. The battery system of claim 1, wherein the second pump is controlled such that during discharge of the battery system the second pump is not energized and during charge of the battery system the second pump is energized.

13. A method of operating a battery system comprising:
providing a negative electrode;
providing a separator adjacent to the negative electrode;
providing a positive electrode separated from the negative electrode by the separator, the positive electrode including an electrode inlet and an electrode outlet;
providing an electrolyte including LiOH located within the positive electrode;
storing $LiOHH_2O$ within a reservoir having a reservoir inlet in fluid communication with the electrode outlet, a first reservoir outlet, and a second reservoir outlet, the second reservoir outlet located lower than the first reservoir outlet such that an unattached solid proximate the first reservoir outlet is forced by gravity toward the second reservoir outlet;
operating a first pump to take a suction from the first reservoir outlet and discharge a first effluent to the electrode inlet during both charge and discharge of the battery system;
controlling a second pump to take a suction from the second reservoir outlet and discharge a second effluent such that during discharge of the battery system the second pump is not energized and during charge of the battery system the second pump is energized; and
mixing the first effluent with the second effluent during charge of the battery system.

14. The method of claim 13, further comprising:
crystallizing super-saturated LiOH electrolyte into $LiOH.H_2O$ using a nucleation structure within the reservoir during discharge of the battery system.

15. The method of claim 13, wherein:
mixing the first effluent and the second effluent comprises mixing the first effluent and the second effluent with a mixing component; and
the method further comprises providing the mixed first effluent and second effluent to the electrode inlet.

16. The method of claim 15, further comprising:
maintaining the mixed first effluent and second effluent provided to the electrode inlet at a temperature above a solubility limit for LiOH in the mixed first effluent and second effluent.

* * * * *